(12) United States Patent
Alsup

(10) Patent No.: US 10,516,627 B2
(45) Date of Patent: Dec. 24, 2019

(54) ETHERNET FRAME INJECTOR

(71) Applicant: INNOVASIC, INC., Albuquerque, NM (US)

(72) Inventor: Andrew David Alsup, Albuquerque, NM (US)

(73) Assignee: INNOVASIC, INC., Albuquerque, NM (US)

( * ) Notice: Subject to any disclaimer, the term of this patent is extended or adjusted under 35 U.S.C. 154(b) by 52 days.

(21) Appl. No.: 15/416,997

(22) Filed: Jan. 26, 2017

(65) Prior Publication Data

US 2017/0214638 A1 Jul. 27, 2017

Related U.S. Application Data

(60) Provisional application No. 62/287,745, filed on Jan. 27, 2016.

(51) Int. Cl.
| | | |
|---|---|---|
| *H04L 12/935* | (2013.01) | |
| *H04L 5/14* | (2006.01) | |
| *H04L 12/741* | (2013.01) | |
| *H04L 12/947* | (2013.01) | |
| *H04L 12/861* | (2013.01) | |
| *H04L 29/06* | (2006.01) | |

(52) U.S. Cl.
CPC ............ *H04L 49/30* (2013.01); *H04L 5/14* (2013.01); *H04L 45/74* (2013.01); *H04L 49/252* (2013.01); *H04L 49/90* (2013.01); *H04L 69/22* (2013.01); *H04Q 2201/02* (2013.01); *H04Q 2201/802* (2013.01)

(58) Field of Classification Search
CPC . H04L 5/14; H04L 69/22; H04L 49/90; H04L 49/30; H04L 49/252; H04L 45/74; H04L 45/60; H04Q 2201/02; H04Q 2201/802
See application file for complete search history.

(56) References Cited

U.S. PATENT DOCUMENTS

| | | |
|---|---|---|
| 5,247,626 A | 9/1993 | Firoozmand |
| 5,732,286 A | 3/1998 | Leger |
| 5,771,235 A | 6/1998 | Tang et al. |
| | (Continued) | |

FOREIGN PATENT DOCUMENTS

| | | |
|---|---|---|
| EP | 0459758 B1 | 7/1999 |
| WO | WO-2008/092589 A1 | 8/2008 |
| | (Continued) | |

OTHER PUBLICATIONS

"International Application Serial No. PCT/US2017/015153, International Search Report dated May 12, 2017", 4 pgs.

(Continued)

*Primary Examiner* — Paul H Masur
*Assistant Examiner* — Michael K Phillips
(74) *Attorney, Agent, or Firm* — Schwegman Lundberg & Woessner, P.A.

(57) ABSTRACT

Frame injection apparatus for injecting frames from a host device into a switched Ethernet network comprises a frame memory operable to receive and store one host frame at a time and to inject the frame onto the Ethernet switched network between network frames and to buffer network frames received during the time that the host frame is being injected onto the network.

20 Claims, 7 Drawing Sheets

(56) References Cited

U.S. PATENT DOCUMENTS

| | | | |
|---|---|---|---|
| 5,822,618 A | 10/1998 | Ecclesine | |
| 5,859,980 A | 1/1999 | Kalkunte | |
| 6,029,202 A | 2/2000 | Frazier et al. | |
| 6,084,877 A | 7/2000 | Egbert et al. | |
| 6,169,742 B1 | 1/2001 | Chow et al. | |
| 6,327,625 B1 | 12/2001 | Wang et al. | |
| 6,363,067 B1 | 3/2002 | Chung | |
| 6,504,846 B1 | 1/2003 | Yu et al. | |
| 6,574,231 B1 | 6/2003 | Leung | |
| 6,577,636 B1 | 6/2003 | Sang et al. | |
| 6,581,113 B1 | 6/2003 | Dwork et al. | |
| 6,584,101 B2 | 6/2003 | Hagglund | |
| 6,584,106 B1 | 6/2003 | Merchant et al. | |
| 6,625,157 B2 | 9/2003 | Niu et al. | |
| 6,807,183 B1 | 10/2004 | Chow et al. | |
| 6,990,114 B1 | 1/2006 | Erimli | |
| 7,242,683 B2 | 7/2007 | Saint Etienne et al. | |
| 7,558,270 B1 * | 7/2009 | Wilford | H04L 45/00 370/395.42 |
| 7,649,843 B2 | 1/2010 | Shanley | |
| 8,144,606 B1 | 3/2012 | Viehweg et al. | |
| 9,619,410 B1 * | 4/2017 | Brandenberger | G06F 13/20 |
| 2002/0087723 A1 | 7/2002 | Williams et al. | |
| 2003/0110344 A1 | 6/2003 | Szczepanek et al. | |
| 2004/0252685 A1 * | 12/2004 | Kagan | H04L 49/251 370/389 |
| 2007/0183415 A1 * | 8/2007 | Fischer | H04L 49/3009 370/389 |
| 2013/0343378 A1 * | 12/2013 | Veteikis | H04L 49/555 370/389 |
| 2014/0169173 A1 * | 6/2014 | Naouri | H04L 47/10 370/237 |
| 2014/0269688 A1 | 9/2014 | Alsup et al. | |
| 2014/0369194 A1 | 12/2014 | Friedman et al. | |
| 2015/0156107 A1 * | 6/2015 | Li | H04L 45/18 370/230 |
| 2017/0118141 A1 | 4/2017 | Alsup | |

FOREIGN PATENT DOCUMENTS

| | | | | |
|---|---|---|---|---|
| WO | WO-2017132391 A1 * | 8/2017 | | H04L 5/14 |
| WO | WO-2017132391 A1 | 8/2017 | | |

OTHER PUBLICATIONS

"International Application Serial No. PCT/US2017/015153, Written Opinion dated May 12, 2017", 5 pgs.

Dittia, Zubin D., et al., "The APIC Approach to High Performance Network Interface Design: Protected DMA and Other Techniques", [online]. [archived on Apr. 11, 2004]. Retrieved from the Internet: <URL: https://web.archive.org/web/20040411005837/https://www.arl.wustl.edu/Publications/1995-99/infocom97zd.pdf>, (2004), 24 pgs.

Raghavendra, C. S., et al., "Reliable Loop Topologies for Large Local Computer Networks", *IEEE Transactions on Computers*, vol. C-34, No. 1, (Jan. 1985), 46-55.

"International Application Serial No. PCT/US2017/015153, International Preliminary Report on Patentability dated Aug. 9, 2018", 7 pgs.

* cited by examiner

ETHERNET FRAME INJECTOR

CLAIM OF PRIORITY

This application claims the benefit of priority of U.S. Provisional Patent Application No. 62/287,745, entitled ETHERNET FRAME INJECTOR, which was filed on 27 Jan. 2016, and which is incorporated by reference herein in its entirety.

TECHNICAL FIELD

This document relates to networks, in general, and to Ethernet switched networks in particular.

BACKGROUND

In an approach to an Ethernet arrangement, an Ethernet end node is attached to a port of a standard Ethernet switch, such as a port on a three-port switch that supports what can be referred to as a line topology. Each of the three ports is functionally equivalent such that any one port can be used to connect to other switches, networks, or end nodes. To support this flexibility, the switches incorporate a substantial amount of complexity, which makes them expensive and inappropriate for certain applications and markets.

SUMMARY

The present inventors have recognized, among other things, that it would be highly desirable to provide a low cost alternative to the standard Ethernet switches to attach a node to an Ethernet switched network.

FIG. 1 shows an example of an approach to an Ethernet arrangement 100 in which an Ethernet end node 101 is attached to a port P2 of an Ethernet switch 103. Ethernet switch port P2 can be part of an Ethernet switch 103 having a plurality of ports P1, P2, P3 supporting an arbitrary network setup with potentially multiple nodes 113, 115 attached. Port P2 may also be part of a three-port switch 103 that supports what can be referred to as a line topology. Each three-port switch 103, 105, 107 shown in FIG. 1 comprises ports P1, P2, P3. In this example, each of the ports P1, P2, P3 is functionally equivalent. Any one port P1, P2, P3 can be used to connect to other switches 103, 105, 107 including the networks 109, 111 at large or to an end node 101 as illustrated by switch 103 that can optionally have end node 101 attached to Port 2 and by the center switch 105 that can be attached to another switch (in this case Network 109) on its port 3.

This document describes, among other things, a method and apparatus that can permit an Ethernet node to be attached to a switched Ethernet network without requiring the overhead associated with a standard switch unit.

An embodiment of a frame injection apparatus for injecting host frames from a host device into a switched Ethernet network comprises an injector receive input coupleable to the switched Ethernet, an injector transmit output coupleable to the switched Ethernet, a host transmit input coupleable to the host device for receiving host frames, a frame memory, a receive router, a transmit frame selector, and injection state apparatus. The frame memory is operable to receive and store one host frame at a time, the frame memory comprising a first memory input, a second memory input, and a memory output, the first memory input is coupled to the host transmit input. The receive router comprises a router receive input coupled to the injector receive input, a first router output coupled to the second memory input, and a second router output. The receive router selectively couples the injector receive input to one of the first router output and the second router output. The transmit frame selector comprises a first selector input coupled to the second router output, a second selector input coupled to the memory output, and a selector output coupled to the injector transmit output. The injection state apparatus is operable to automatically determine a first, second and third operational state for the frame injection apparatus. The first operational state comprises an idle state such that a network frame received at the injector receive input from the Ethernet switched network is coupled to the injector transmit output via the receive router and the transmit frame selector. The second operational state comprises storing a host frame received at the host transmit input in the frame memory. The third operational state comprises a transmit state such that the transmit frame selector couples the memory output to the injector transmit output to transmit a frame stored in the frame memory onto the Ethernet switched network.

The frame injection apparatus may be operable in the second operational state concurrent with the frame injection apparatus operating the first operational state.

The frame injection apparatus may operate in the first operational state until such time as the injection state apparatus transitions to the third operational state.

The frame injection apparatus transitions to operation in the third operational state upon concurrence of the frame memory comprising a full host frame stored therein and the transmit frame selector not in the process of transmitting a network frame.

When the frame injection apparatus is in the third operational state, the receive router couples the router receive input to first router output to route a network frame received at the injector receive input through the frame memory and the transmit selector to the injector transmit output.

When the frame injection apparatus is in the third operational state, each network frame is routed through the frame memory to the injector transmit output.

The frame injection apparatus may transition from the third operational state to one of the first operational state and the second operational state when the frame memory is empty.

The embodiment may further comprise a size memory to store the size of a frame stored in the frame memory, the size being stored when an entire frame is stored in the frame memory. The injection state apparatus automatically causes the frame injection apparatus to operate in the first operational state when the size is zero.

The injection state apparatus may automatically causes the frame injection apparatus to operate in the third operational state when the size is not zero.

A second embodiment apparatus for injecting frames from a host device onto an Ethernet network comprises a first full duplex port coupleable to the switched Ethernet network and comprising a first port receive output and a first port transmit input, a second full duplex port coupleable to the Ethernet network and comprising a second port receive output and a second port transmit input, and a third duplex port coupleable to the host device and comprising a first host receive input, and a host transmit output. The embodiment further comprises frame injection apparatus and receives analysis apparatus. The frame injection apparatus comprises an injector receive input, a host transmit input, and an injector transmit output, the injector transmit output coupled to the second port transmit input. The receive analysis apparatus comprises a first port analysis first input coupled to the first port receive output, a first port analysis first output coupled to the first host receive input, and a first port analysis second output coupled to the injector receive input. The receive analysis apparatus automatically routes a network frame received at the first port receive input to either the first host receive input or to the injector receive input. The frame injection apparatus comprises a frame memory, a size memory, a receive router, a transmit frame selector and injection state apparatus. The frame memory is operable to receive and store one host frame at a time and comprises a first memory input, a second memory input, and a memory output. The first memory input is coupled to the host transmit output. The size memory stores the number of bytes in each Ethernet frame stored in the frame memory. The receive router comprises a router receive input coupled to the injector receive input, a first router output coupled to the second memory input, and a second router output. The receive router selectively couples the injector receive input to one of the first router output and the second router output. The transmit frame selector comprises a first selector input coupled to the first router output, a second selector input coupled to the memory output, and a selector output coupled to the injector transmit output. The injection state apparatus is operable to automatically determine a first, second and third operational state for the frame injection apparatus. The first operational state comprises an idle state such that a network frame received at the injector receive input from the Ethernet switched network is coupled to the injector transmit output via the receive router and the transmit frame selector. The second operational state comprises storing in the frame memory a host frame received at the host transmit output. The third operational state comprises a transmit state such that the transmit frame selector couples the memory output to the injector transmit output to transmit a network frame or a host frame stored in the frame memory onto the Ethernet switched network.

In the second embodiment, the frame injection apparatus is operable in the second operational state concurrent with the frame injection apparatus operating the first operational state.

In the second embodiment, the frame injection apparatus operates in the first operational state until such time as the injection state apparatus transitions to the third operational state.

In the second embodiment, the frame injection apparatus transitions to operation in the third operational state upon concurrence of the frame memory comprising a full host frame received at the host transmit input being stored in the frame memory and the transmit frame selector not in the process of transmitting a network frame.

In the second embodiment, when the frame injection apparatus is in the third operational state, the receive router couples the router receive input to the first router output and the first router output is coupled to the second memory input to route a network frame received at the injector receive input through the frame memory and the transmit selector to the injector transmit output.

In the second embodiment, when the frame injection apparatus is in the third operational state, each network frame is routed through the frame memory to the injector transmit output.

In the second embodiment, the frame injection apparatus transitions from the third operational state to one of the first operational state and the second operational state when the frame memory is empty.

In the second embodiment, the frame injection apparatus may comprise a size memory to store a size of a frame stored in the frame memory. The size is stored when an entire frame is stored in the frame memory. The injection state apparatus automatically causes the frame injection apparatus to operate in the first operational state when the size is zero.

In the second embodiment, the injection state apparatus automatically causes the frame injection apparatus to operate in the third operational state when the size is not zero.

A third embodiment of an apparatus for injecting frames onto a switched Ethernet network from a host device comprising a first and a second host receive input and a first and a second host transmit output is provided. The apparatus comprises a first full duplex port coupleable to the switched Ethernet network. The first full duplex port comprises a first port receive input and a first port transmit output. The apparatus also comprises a second full duplex port coupleable to the switched Ethernet network. The second full duplex port comprises a second port receive input and a second port transmit output. The apparatus further comprises first frame injection apparatus and first receive analysis apparatus. The first frame injection apparatus comprises a first injector receive input, a first injector transmit output, and a first injector host receive input coupled to the host first transmit output. The first receive analysis apparatus comprises a first port analysis input coupled to the first port receive output, a first port analysis first output coupled to the first host receive input, and a first port analysis second output coupled to the injector receive input. The receive analysis apparatus automatically routes a frame received at the first port receive output to either the frame injection apparatus or to the host device. The first frame injection apparatus is operable to inject frames from the host device onto the switched Ethernet network via the second full duplex port.

The third embodiment may further comprise a second frame injection apparatus and a second receive analysis apparatus. The second frame injection apparatus comprises a second injector receive input, a second injector transmit output coupled to the first port transmit input, and a second host transmit input coupled to the host second transmit output. The second receive analysis apparatus comprises an input coupled to the second port receive input, a first output coupled to the second host receive input, and a second output coupled to the second injector first receive input. The receive analysis apparatus automatically routes a frame received at the second port receive input to either the second frame injection first receive input or to the second host receive input. The second frame injection apparatus is operable to inject frames from the host device onto the switched Ethernet network via the first full duplex port.

In the third embodiment, the first frame injection apparatus may comprise a frame memory, a size memory, a receive router, and a transmit frame selector. The frame memory is operable to receive and store one frame at a time. The frame memory comprises a first memory input, a second memory input, and a memory output. The size memory stores the number of bytes in each Ethernet frame stored in the frame memory. The receive router comprises a router receive input coupled to the first port receive output via the first injector receive input, a first router output, and a second router output. The receive router selectively couples the router receive input to one of the first router output and the second router output. The transmit frame selector comprises a first input coupled to the first router output, a second input coupled to the memory output, and a selector output coupled to the second port transmit output via the first injector transmit output. The injection state apparatus is operable to automatically select a first, second and third operational state. The first operational state comprises coupling a network frame received at the first injector receive input to the first injector transmit output via the first receive router and the transmit frame selector. The second operational state comprises storing a host frame received at the host transmit input in the frame memory. The third operational state comprises coupling the memory output to the first injector transmit output to transmit a frame stored in the frame memory to the second port transmit output. The second frame injection apparatus comprises a frame memory, a size memory, a receive router, and a transmit frame selector. The frame memory is operable to receive and store one frame at a time, the frame memory comprising a first memory input, a second memory input, and a memory output. The size memory stores the number of bytes in each Ethernet frame stored in the frame memory. The receive router comprises a router receive input coupled to the second port receive output via the second injector receive input, a first router output, and a second router output. The receive router selectively couples the router receive input to one of the first router output and the second router output. The transmit frame selector comprises a first input coupled to the first router output, a second input coupled to the memory output, and an selector output coupled to the first port transmit output via the second injector transmit output. The injection state apparatus is operable to automatically select a first, second and third operational state. The first operational state comprises coupling a network frame received at the second injector receive input to the second injector transmit output via the receive router and the transmit frame selector. The second operational state comprises storing a host frame received at the host transmit input in the frame memory. The third operational state comprises coupling the memory output to the first injector transmit output to transmit a frame stored in the frame memory to the first port transmit output.

In the third embodiment, the first frame injection apparatus and the second frame injection apparatus may each be operable in the second operational state concurrent with operating the first operational state.

In the third embodiment, the first frame injection apparatus and the second frame injection apparatus may each operate in the first operational state until such time as the injection state apparatus transitions to the third operational state.

In the third embodiment, the first frame injection apparatus and the second frame injection apparatus may each transition to operation in the third operational state upon concurrence of its corresponding the frame memory comprising a full host frame received at the host transmit input being stored in the frame memory and the transmit frame selector not in the process of transmitting a network frame.

In the third embodiment, when either the first frame injection apparatus or the second frame injection apparatus is in the third operational state, a host frame received at the corresponding host transmit input and stored in a corresponding the frame memory may be injected onto the switched Ethernet network.

In the third embodiment, when either the first frame injection apparatus and the second frame injection apparatus is in the third operational state, each network frame received at a corresponding the first injector receive input or the second injector receive input may be routed through the corresponding the frame memory to the corresponding the first injector transmit output or the second injector transmit output.

In the third embodiment, each of the first frame injection apparatus and the second frame injection apparatus transitions from the third operational state to one of the first operational state and the second operational state when its corresponding the frame memory is empty.

In the third embodiment, each of the first frame injection apparatus and the second frame injection apparatus may comprise a size memory to store a size of a frame stored in the corresponding frame memory. The size is stored when an entire frame is stored in the frame memory. Each injection state apparatus automatically causes the corresponding first frame injection apparatus and the second frame injection apparatus to operate in the first operational state when the size is zero.

In the third embodiment, each injection state apparatus may automatically cause the corresponding first frame injection apparatus and the second frame injection apparatus to operate in the third operational state when the size is not zero.

In the third embodiment, each of the first frame injection apparatus and the second frame injection apparatus may comprise a size memory to store a size of a frame stored in the frame memory, the size being stored when an entire frame is stored in the frame memory. Each injection state apparatus may automatically cause the corresponding first frame injection apparatus and the second frame injection apparatus to operate in the first operational state when the size is zero.

In the third embodiment, each injection state apparatus may automatically cause each of the first frame injection apparatus and the second frame injection apparatus to operate in the third operational state when the size is not zero.

In a fourth embodiment, apparatus is provided for injecting frames from a host device comprising first and second host receive inputs and a host transmit output onto a switched Ethernet network. The apparatus comprises a first full duplex port and a second full duplex port each coupleable to the switched Ethernet network. The first full duplex port comprises a first port receive output and a first port transmit input. The second full duplex port comprises a second port receive output and a second port transmit input. The apparatus further comprises frame injection apparatus having an injector receive input, an injector transmit output, and a host transmit input coupled to the host transmit output; first receive analysis apparatus having a first port analysis input coupled to the first port receive output, a first port analysis first output coupled to the first host receive input, and a first port analysis second output; second receive analysis apparatus having a first analysis port input coupled to the second port receive output, a first port analysis first output coupled to the second host receive input, and a second port analysis second output; and active direction logic comprising a first input coupled to the first port analysis second output, a second input coupled to the second port analysis second output, a direction receive output coupled to the injector receive input, a direction transmit input coupled to the injector transmit output, a first transmit output coupled to the first port transmit input, and a second transmit output coupled to the second port transmit input. The apparatus is operable to selectively inject frames from the host device onto the switched Ethernet network via one of the first full duplex port and the second full duplex port.

In the fourth embodiment, the frame injection apparatus comprises: a frame memory, a size memory, a receive router, and a transmit frame selector. The frame memory is operable to receive and store one frame at a time and comprises a first memory input, a second memory input, and a memory output. The first memory input is coupled to the injector transmit output. The size memory stores the number of bytes in each Ethernet frame stored in the frame memory. The receive router comprises a router input coupled to the injector receive input, a first router output, and a second router output. The receive router selectively couples the first receive input to one of the first router output and the second router output. The transmit frame selector comprises a first input coupled to the first router output, a second input coupled to the memory output, and an output coupled to the injector transmit output. The injection state apparatus is operable to automatically select a first, second and third operational state. The first operational state comprises coupling a network frame received at the injector receive input to the injector transmit output via the first receive router and the first transmit frame selector. The second operational state comprises storing a host frame received at the injector receive input in the frame memory. The third operational state comprises coupling the memory output to the host transmit output to transmit a frame stored in the frame memory.

In the fourth embodiment, the frame injection apparatus may be operable in the second operational state concurrent with the frame injection apparatus operating in the first operational state.

In the fourth embodiment, the frame injection apparatus may operate in the first operational state until such time as the injection state apparatus transitions to the third operational state.

In the fourth embodiment, the frame injection apparatus may transition to operation in the third operational state upon concurrence of the frame memory comprising a full host frame received at the third receive input being stored in the frame memory and the transmit frame selector not in the process of transmitting a network frame.

In the fourth embodiment, when the frame injection apparatus is in the third operational state, the receive router may couple the first receive input to the second router output and the second router output is coupled to the second memory input to route a network frame received at the first receive input through the frame memory and the transmit selector to the second transmit output during the time that the host frame stored in the frame memory is being transmitted via the transmit selector to the second transmit output.

In the fourth embodiment, when the frame injection apparatus is in the third operational state, each network frame may be routed through the frame memory to the second transmit output.

In the fourth embodiment, the frame injection apparatus may transition from the third operational state to one of the first operational state and the second operational state when the frame memory is empty.

In the fourth embodiment, the frame injection apparatus may comprise a size memory to store a size of a frame stored in the frame memory, the size being stored when an entire frame is stored in the frame memory. The injection state apparatus automatically causes the frame injection apparatus to operate in the first operational state when the size is zero.

In the fourth embodiment, the injection state apparatus may automatically cause the frame injection apparatus to operate in the third operational state when the size is not zero.

BRIEF DESCRIPTION OF THE DRAWINGS

The present subject matter will be better understood from a reading of the following detailed description in conjunction with the drawing figures, in which like designators identify like elements, and in which.

DETAILED DESCRIPTION

Figure 1:
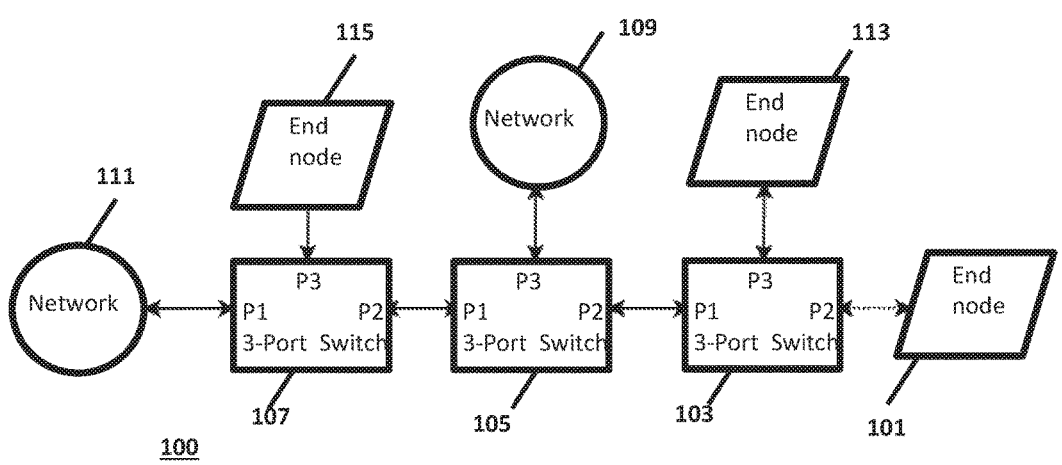
FIG. 1 illustrates an example of an approach that can include connection of an Ethernet end node attached to a standard Ethernet switch port.
Figure 2:
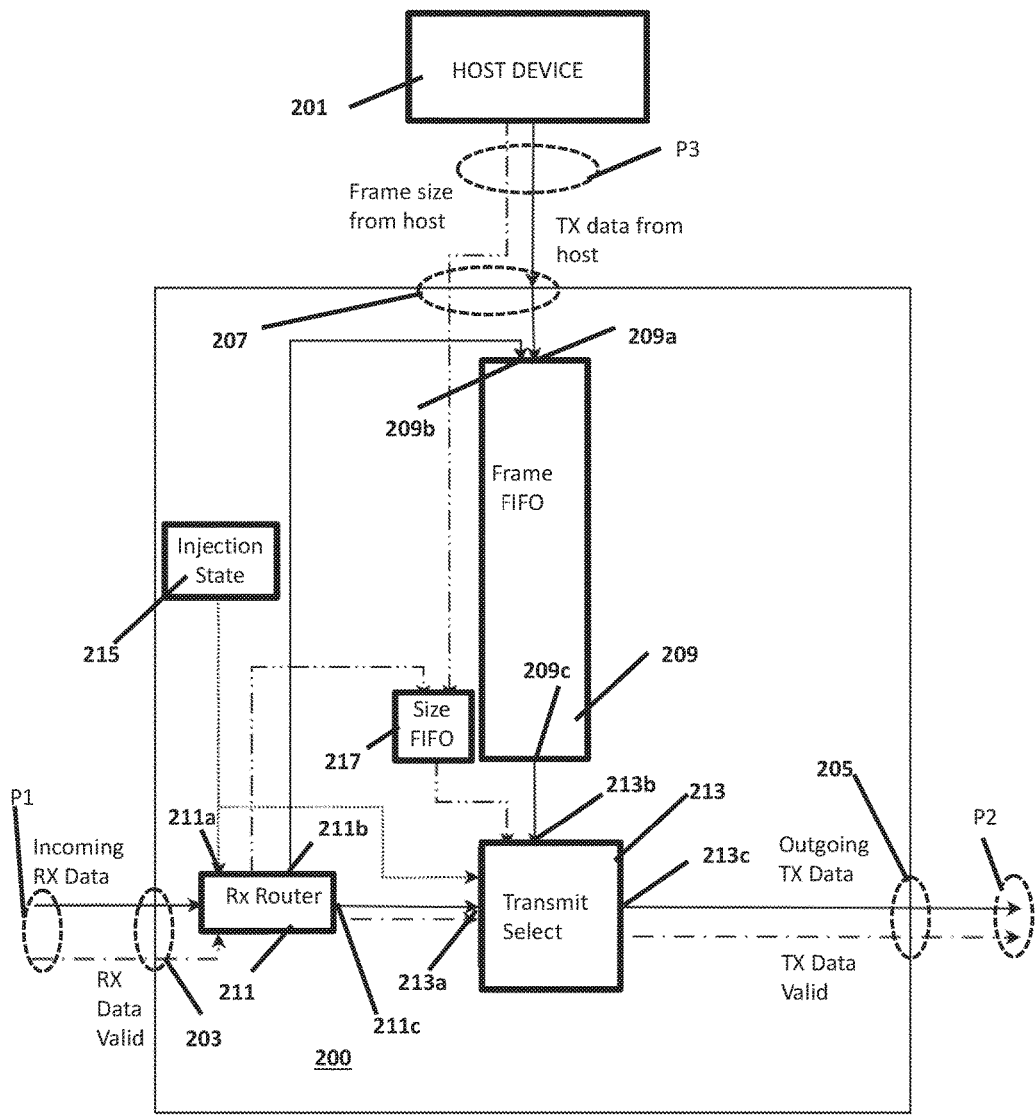
FIG. 2 illustrates a frame injection embodiment.

FIG. 2 shows an example of a frame injection apparatus 200 that can allow construction of devices that can be attached to an Ethernet network without requiring the overhead and complexity of a full switch of the type shown in FIG. 1. The frame injection apparatus 200 can be used with full duplex ports. In various embodiments described below, one or more frame injection apparatus 200 can be used to provide full duplex capability at two switched Ethernet network ports.

Frame injection apparatus 200 can be provided for injecting host frames from a host device 201 into a switched Ethernet network. The frame injection apparatus 200 can include an injector receive input 203 such as can be coupleable to the switched Ethernet, an injector transmit output 205 such as can be coupleable to the switched Ethernet, a host transmit input 207 such as can be coupleable to the host device for receiving host frames, a frame memory 209 circuit, a receive router 211 circuit, a transmit frame selector 213 circuit, and injection state apparatus 215, such as a state machine.

Frame memory 209 can be configured and operable to receive and store one host frame at a time. Frame memory 209 can include a first memory input 209*a*, a second memory input 209*b*, and a memory output 209*c*. First memory input 209*a* can be coupled to host transmit input 207.

Receive router 211 can include a router receive input 211*a* coupled to injector receive input 203, a first router output 211*b* coupled to second memory input 209*b*, and a second router output 211*c*. Receive router 211 can selectively couple injector receive input 203 such as to one of first router output 211*b* and second router output 211*c*. The receive router 211 may include logic circuitry to perform the functions described. It is not necessary for the receive router 211 to receive an entire frame before passing the frame to the destination (e.g., whether the destination is the frame FIFO or a port for transmitting. In certain embodiments, the receive router 211 begins to forward the received frame as soon as it receives the address (e.g., a six byte address field). This can reduce the latency involved in communicating frames among node devices of the network. This simplifies the node device as compared to an Ethernet Switch.

Transmit frame selector 213 can include a first selector input 213*a* coupled to second router output 211*c*, a second selector input 213*b* coupled to memory output 209*c*, and a selector output 213*c* coupled to injector transmit output 205.

The injection or operational states of frame injection apparatus 200 can include one or more of the following:

"Idle"—frame injection apparatus 200 has no data and is not involved in the movement of host frames across its associated host device coupled to port 207.

"Filling"—frame injection apparatus 200 is in the process of having a host frame inserted into its corresponding host device.

"Transmitting"—frame injection apparatus 200 has frame data in the process of being transmitted out injector transmit output 205 and any incoming frame data received at injector receive input 203 is routed through frame memory 209.

Injection state apparatus 215 can be configured and operable to automatically determine the first, second and third operational state for frame injection apparatus 200. The first operational state can include an idle state such that a network frame received at injector receive input 203 from the Ethernet switched network is coupled to injector transmit output 205 via receive router 211 and transmit frame selector 213.

The second operational state can include storing a host frame received at the host transmit input 207 in frame memory 209.

The third operational state can include a transmit state such that transmit frame selector 213 couples frame memory output 209c to injector transmit output 205 to transmit a frame stored in the frame memory 209 onto the Ethernet switched network.

Frame injection apparatus 200 is operable in the second operational state concurrent with frame injection apparatus 200 operating the first operational state.

Frame injection apparatus 200 operates in the first operational state until such time as the injection state apparatus 215 transitions to the third operational state.

Frame injection apparatus 200 transitions to operation in the third operational state upon concurrence of frame memory 209 receiving and storing a full host frame and the transmit frame selector 213 not in the process of transmitting a network frame.

When frame injection apparatus 200 is in the third operational state, receive router 211 couples a network frame received at router receive input 211a to first router output 211b to route a network frame received at injector receive input 203 through frame memory 209 and transmit frame selector 213 to the injector transmit output 205.

When frame injection apparatus 200 is in the third operational state, each network frame received at injector receive input 203 is routed through frame memory 209 to injector transmit output 205.

Frame injection apparatus 200 transitions from the third operational state to one of the first operational state and the second operational state when frame memory 209 is empty.

Frame injection apparatus 200 further comprises size memory 217. Size memory 217 can be used to store the size of a frame that is stored in frame memory 209. The size is stored when an entire frame is stored in frame memory 209. Injection state apparatus 215 automatically causes the frame injection apparatus 200 to operate in the first operational state when the size stored in size memory 217 is zero. Injection state apparatus 215 automatically causes frame injection apparatus 200 to operate in the third operational state when the size stored in size memory 217 is not zero.

When frame injection apparatus 200 is in the first or idle state, an incoming receive frame is forwarded directly as an outgoing transmit frame, along with a corresponding data valid signal. Thus a frame received at one port is coupled to and transmitted out the other port with only minimal delay. When a received frame is complete, the receive Rx data valid signal for the received frame is deasserted, the corresponding transmit TX data valid signal for the transmitted frame is deasserted, and the outgoing transmission is complete. As pointed out above, when frame injection apparatus 200 is in the idle state both frame memory 209 and the size memory 217 are empty.

When frame injection apparatus 200 is in the second or filling state, any incoming receive frame is handled the same as it is when frame injection apparatus 200 is in the first or idle state, i.e., receive frame data is immediately transmitted out the other port. In the second state, host frame data from the host interface is loaded into frame memory 209. When all host frame data has been stored in frame memory 209 the size, e.g., the number of bytes in the frame, of the frame just stored into frame memory 209 is stored into the size memory 217. When all of the frame data in a frame to be transmitted by the host has been loaded into frame memory 209 and the size has been stored into size memory 217, injection state apparatus 215 causes frame injection apparatus 200 to transition to the third or transmitting state.

When frame injection apparatus 200 is in the third or transmitting state, any network receive frame that is in the process of being transmitted through frame injection apparatus 200 continues without interruption. When frame memory 209 transitions from not empty to empty, injection state apparatus 215 causes frame injection apparatus 200 to transition to the first or idle state.

On the frame boundary of any frame, transmit frame selector 213 evaluates the injection state of frame injection apparatus 200. If frame injection apparatus 200 is in the third state, then transmit frame selector 213 will begin transmitting frame data from frame memory 209. Transmit frame selector 213 can include a counter or other component that counts the number of bytes that have been transmitted. A value read from size memory 217 determines how many bytes are to be transmitted in the current frame. When the appropriate number of bytes have been transmitted, transmit frame selector 213 will deassert the transmit TX data valid signal thereby signaling to a transmit MAC (that is not shown) that it should complete the current frame. Following this, the transmit frame selector 213 will re-evaluate the injection state and behave accordingly.

On any frame boundary, receive router 211 will also evaluate the injection state. If frame injection apparatus 200 is in the third state, receive router 211 will begin forwarding a network frame into frame memory 209. Receive router 211 maintains a count of the number of bytes in the current network frame. When the receive router 211 detects a deassertion of receive Rx data valid it will write the number of bytes in the network frame into the size memory 217.

With frame injection apparatus 200, a host frame can be injected into a stream of Ethernet traffic between two Ethernet ports P1, P2 (receive and transmit). Frame injection apparatus 200 can include or use a reduced or even minimal amount of necessary storage and operational logic. Depending on the amount of traffic on the Ethernet channel, the injection of a single host frame may involve multiple network frames being forwarded via the frame memory 209.

Sizing of the frame memory 209 is a function of the maximum size frame that is intended to be transmitted by the host port. The size should be the size of the maximum transmitted host frame plus some additional storage, such as to account for clock rate differences on the receive side vs. the transmit side.

The maximum clock difference for Ethernet is 200 Parts-per-million. So, for example, if the host can transmit a maximum standard Ethernet frame of 1522 bytes, then a frame memory 209 size of 1536 bytes provides 14 additional bytes which allows for a total of (14/200)*1 million=70,000 bytes to traverse the frame memory 209 in the third or transmitting state without buffer overflow in a worst case.

Sizing of the size memory 217 is also a function of the maximum size host frame in addition to the minimum size network frame that can be received over Ethernet. If a maximum size Ethernet network frame is transmitted by the host (1522 bytes+8 bytes preamble+12 byte-times inter-packet gap=1542), the largest number of minimum size frames that can be received (64-bytes data+8 bytes preamble+12 byte-times inter-packet gap=84 byte times) is 1542/84=18.357 frames. So size memory 217 would have storage for at least 19 size entries.

Figure 3:
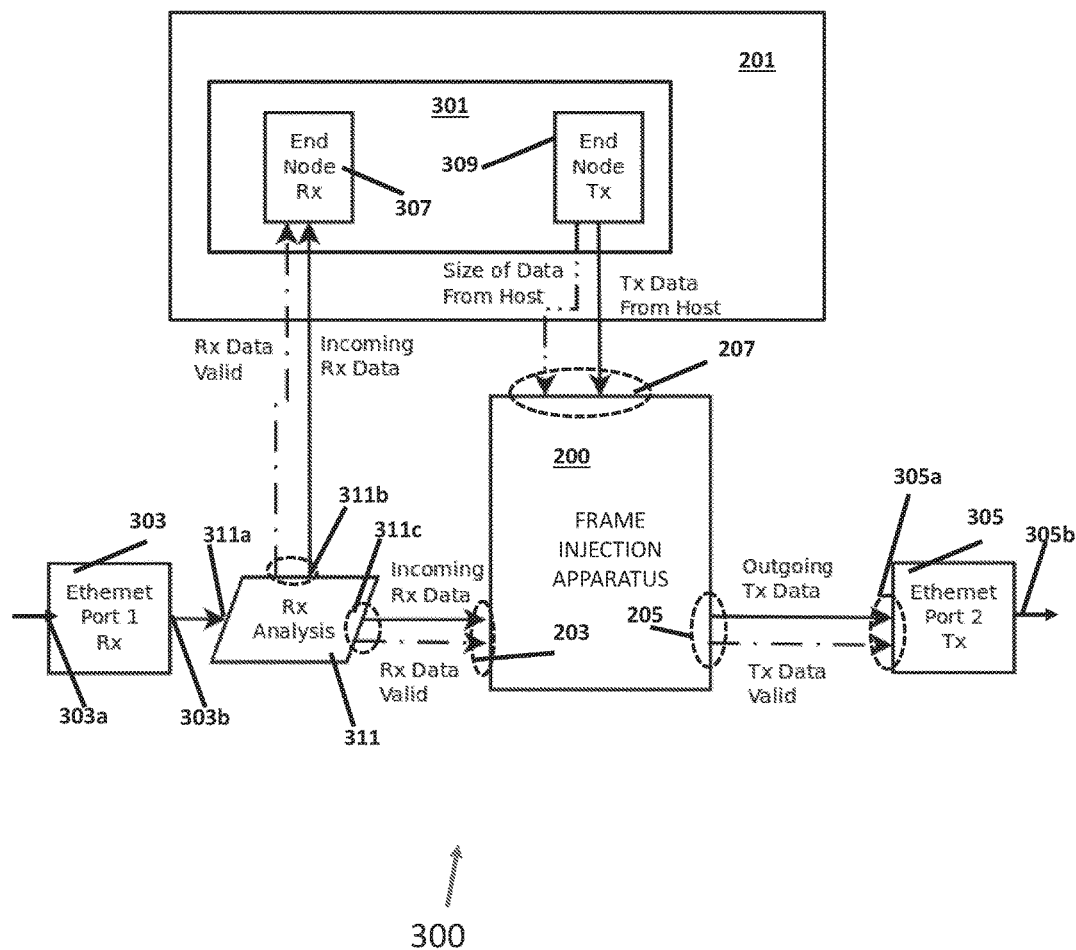
FIG. 3 illustrates a second embodiment.

FIG. 3 shows an example of a frame injection apparatus 200 in terms of a single path direction coupling host device 201 into an Ethernet path across two Ethernet ports 303, 305. Only Ethernet Port 1 Rx, the receive portion of first full duplex port 303, the Port 1 Ethernet MAC is shown. Similarly, only Ethernet Port 2 TX, the transmit portion of second full duplex port 305, the Port 2 Ethernet MAC is shown.

In FIG. 3, apparatus 300 for injecting frames from a host device 201 onto an Ethernet network can include a first full duplex port 303 coupleable to the switched Ethernet network and can include a first port receive output 303b and a first port transmit input 303a, a second full duplex port 305 coupleable to the Ethernet network and can include a second port receive output 305b and a second port transmit input 305a, and a third duplex port 301 coupleable to or incorporated into host device 201 and can include a first host receive input 307, and a host transmit output 309. Apparatus 300 further can include frame injection apparatus 200 and receive analysis apparatus 311. Frame injection apparatus 200 can include injector receive input 203, host transmit input 207, and injector transmit output 205. Injector transmit output 205 can be coupled to the second port transmit input 305a. Receive analysis apparatus 311 can include a first port analysis first input 311a coupled to the first port receive output 303b, a first port analysis first output 311b coupled to the first host receive input 307, and a first port analysis second output 311c coupled to injector receive input 203. Receive analysis apparatus 311 can automatically route a network frame received at the first port receive input 303a to either first host receive input 307 or to injector receive input 203.

FIG. 2 describes details of the frame injection apparatus 200 of FIG. 3. As described above frame injection apparatus 200 automatically determines a first, second and third operational state for frame injection apparatus 200. The first operational state comprises an idle state such that a network frame received at the injector receive input 203 from the Ethernet switched network is coupled to the injector transmit output 205. The second operational state comprises storing a host frame received at the host transmit output 207. The third operational state comprises a transmit state such that a stored host frame is transmitted onto the Ethernet switched network via injector transmit output. When the frame injection apparatus 200 is in the third operational state, each network frame is routed through the frame memory to the injector transmit output.

Frame injection apparatus 200 transitions from the third operational state to one of the first operational state and the second operational state when neither a host frame nor a network frame is stored therein.

Host receive input 303 is shown as end node Rx that represents the portion of a duplex port through which a frame is forwarded to host 201.

Host transmit output 305 is shown as end node TX that represents the transmit portion of the duplex port through which the host sends a frame to frame injection apparatus 200.

Host 201 as an end node is not allowed to transmit a frame while the frame injection apparatus 200 is in the third or transmitting state.

Receive analysis apparatus 311 can comprise logic that determines what to do with an incoming network frame. Receive analysis apparatus 311 can comprise a small memory for storing incoming network frame data until enough data has been received to make a forwarding decision. In certain embodiments, the receive analysis apparatus is configured to make a forwarding decision as soon as it receives one or both of a destination address and an Ethertype type field of the frame. The Ethertype field can include a value that identifies the type of high-level protocol data carried in the packet data field of the frame. In an illustrative embodiment, the forwarding decisions that can be made can include:

Forward the received network frame out second full duplex port 305 only;

Forward the received network frame to host device or end node 201 only;

Forward the received network frame to both second full duplex port 305 and to host device or end node 201; and Discard the received network frame.

Figure 4:
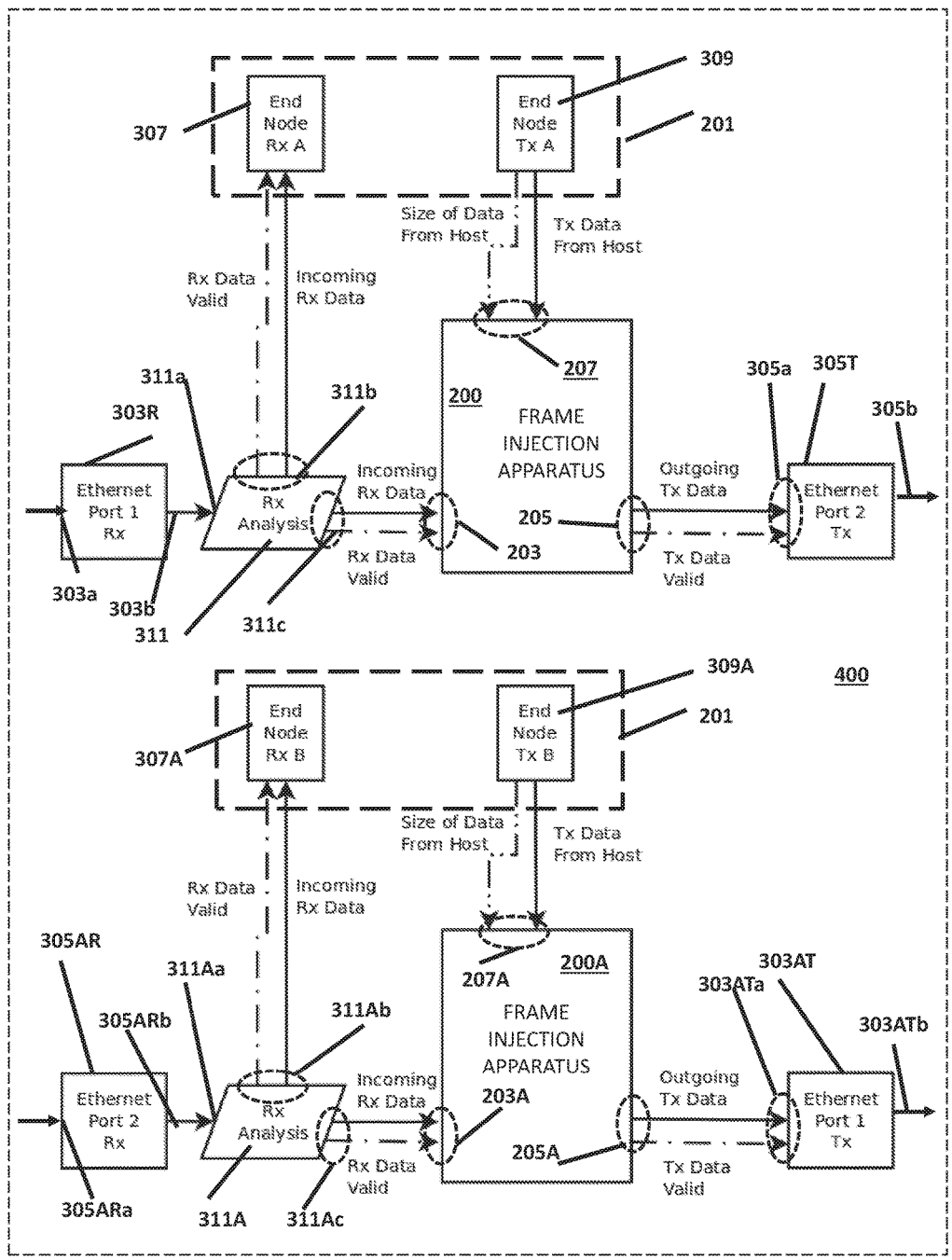
FIG. 4 illustrates a third embodiment.

FIG. 4 shows a two-port device 400 in which frame injection apparatus 200 can be replicated, e.g., duplicated, for example, one frame injection apparatus 200, 200A can be provided for each direction. For example, the first direction can be transmission of a network frame from first full duplex port 303 to second full duplex port 305 and the second direction can be from second full duplex port 305 to first full duplex port 303.

The embodiment of FIG. 4 can provide an apparatus 400 for injecting frames onto a switched Ethernet network from a host device 201 comprising a first host receive input 307, a second host receive input 307A, a first host transmit output 309, and a second host transmit output 309A. Apparatus 400 can comprise a first full duplex port 303R, 305T coupleable to the switched Ethernet network. The first full duplex port can comprise a first port receive input 303R and a first port transmit output 305T. Apparatus 400 can also comprise a second full duplex port 305AR, 303AT coupleable to the switched Ethernet network. The second full duplex port can comprises a second port receive input 305AR and a second port transmit output 303AT. Apparatus 400 can further comprise first frame injection apparatus 200 and first receive analysis apparatus 311. First frame injection apparatus 200 can comprise a first injector receive input 203, a first injector transmit output 205, and a first injector host receive input 207 coupled to host first transmit output 309. First receive analysis apparatus 311 can comprise a first port analysis input 311a coupled to first port receive output 303b, a first port analysis first output 311b coupled to first host receive input 307, and a first port analysis second output 311c coupled to the injector receive input 203. Receive analysis apparatus 311 can be configured to automatically route a frame received at the first port receive output 303b to either frame injection apparatus 200 or to host device 201. First frame injection apparatus 200 can be configured such that it is operable to inject frames from host device 201 onto the switched Ethernet network via second full duplex port 305T.

Apparatus 400 can further comprise a second frame injection apparatus 200A and a second receive analysis apparatus 311A. Second frame injection apparatus 200A can comprise a second injector receive input 203A, a second injector transmit output 205A, and a second injector host transmit input 207A coupled to host second transmit output 309A. Second receive analysis apparatus 311A can comprise a second port analysis input 311Aa coupled to the second port receive output 305ARb, a second port analysis first output 311Ab coupled to second host receive input 307A, and a second output coupled to the second injector receive input 203A. Receive analysis apparatus 311A can be configured to automatically route a frame received at second port receive input 305ARb to either second frame injection apparatus 200A or to second host receive input 307A. Second frame injection apparatus 200A can be configured such that it is operable to inject frames from the host device 201 onto the switched Ethernet network via the first full duplex port 305AT.

The operation of each frame injection apparatus 200, 200A can be independent from the other, allowing frames to be transmitted out both port P1 303 and port P2 305 simultaneously.

Figure 5:
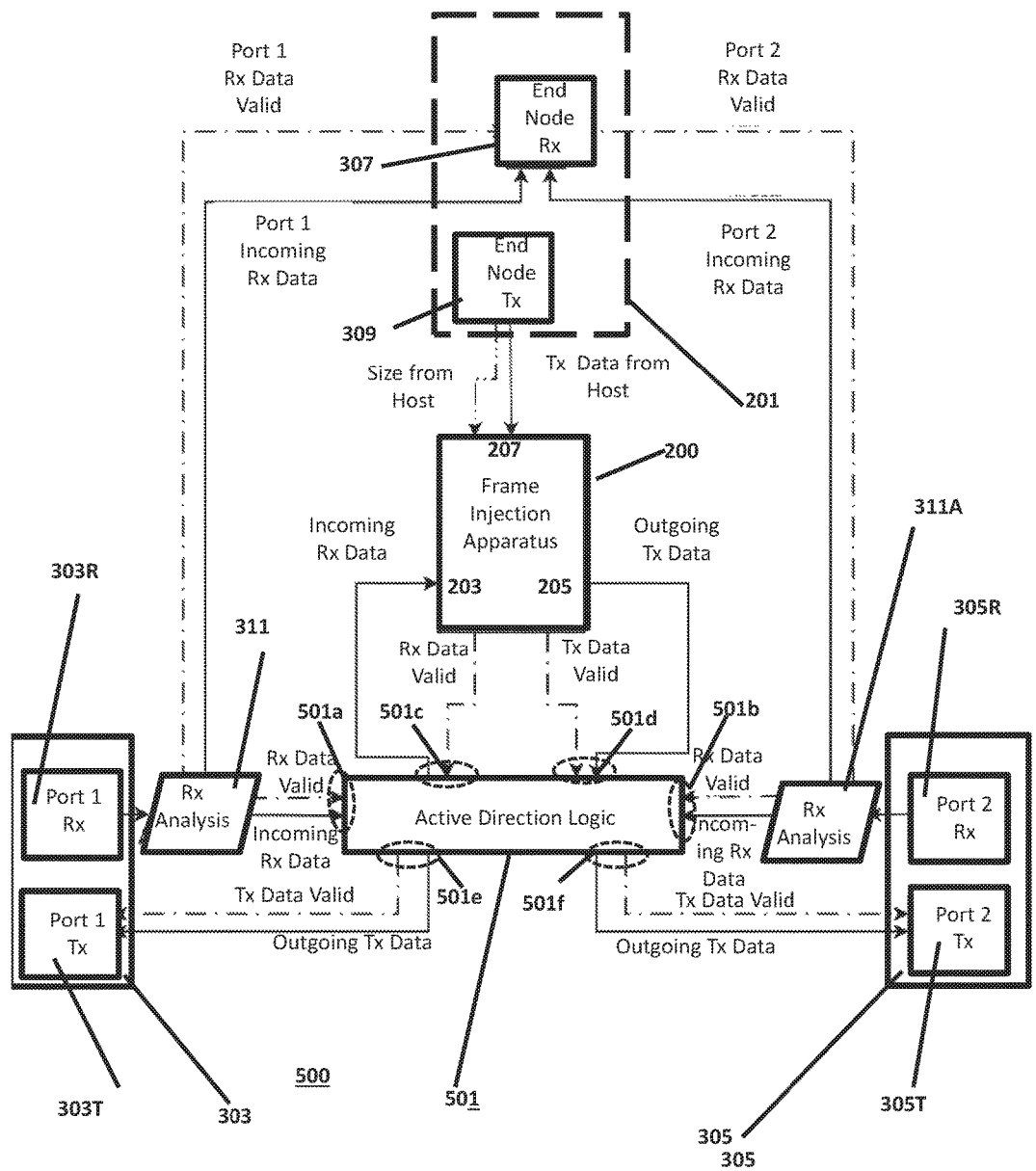
FIG. 5 illustrates a fourth embodiment.

FIG. 5 shows an example such as can reduce the amount of logic and memory used. In the example of FIG. 5, an apparatus 500 can comprise a single shared injection apparatus 200 that can be shared across both port P1 303 and port P2 305, such as shown in FIG. 5.

In operation, host 201 transmits only one frame in a single direction at a time. The active direction for transmitting a host frame and resulting connections are managed by an active direction logic block 501.

Apparatus 500 can be configured such that it is operable to inject frames from a host device 201 that can comprise first and second host receive inputs 307 and a host transmit output 309 onto a switched Ethernet network. Apparatus 500 can comprise a first full duplex port P1 303 and a second full duplex port P2 305, each coupleable to the switched Ethernet network. First full duplex port 303 can comprise a first port receive output 303R and a first port transmit input 303T. The second full duplex port P2 305 can comprise a second port receive output 305R and a second port transmit input 305T.

Apparatus 500 further can comprise frame injection apparatus 200 that can be identical to frame injection apparatus 200 such as described above; first receive analysis apparatus 311 can be identical to that described above with respect to FIG. 4; second receive analysis apparatus 311A can be identical to that described above with respect to FIG. 4; and can further comprise active direction logic 501.

Active direction logic 501 can comprise a first input 501A coupled to first port receive analysis apparatus 311 second output 311b, a second input 501B coupled to the second port receive analysis apparatus 311A second output 311Ab, a direction receive output 501c coupled to injector receive input 203, a direction transmit input 501d coupled to injector transmit output 205, a first transmit output 501e coupled to the first port transmit input 303T, and a second transmit output 501f coupled to second port transmit input 305T. Apparatus 500 can be configured such that it is operable to selectively inject frames from host device 201 onto the switched Ethernet network via one of first full duplex port P1 303 and second full duplex port P2 305.

Active direction logic 501 can be configured such that it is operable to determine from each host frame whether the frame is to be transmitted to the Ethernet switched network via full duplex port P1 303 or full duplex port P2 305. Other various implementations of active direction logic 501 may provide the routing of network and host frames.

In a further embodiment, a frame injection apparatus can be combined with an Ethernet interface module EIM, such as shown in FIGS. 6, 7, 8, and 9.

Each Ethernet interface module EIM can comprise full duplex Ethernet ports P1, P2. Each Ethernet port P1, P2 can comprise an Ethernet physical transceiver and a media access control.

The Ethernet physical transceiver can be referred to as a physical layer transmitter and/or receiver, a physical layer transceiver, a PHY transceiver, a PHYceiver, or simply a PHY. A PHY can be included on Ethernet devices. Its purpose can include providing analog signal physical access to the Ethernet link. A PHY can implement hardware send and receive function of Ethernet frames. A PHY can interface to network line modulation at one side and to binary packet signaling at the other side. A PHY can be used in conjunction with a second chip or interfaced to a microcontroller that can be configured to provide the higher layer Media Access Control or MAC functions. Institute of Electrical and Electronic Engineers ("IEEE") standard IEEE 802.3-2002 section 4.1.4 sets out functions required of a MAC.

As used herein, PHY and MAC refer to components that provide the PHY and MAC functions, respectively.

Each Ethernet interface module EIM can comprise PHY and MAC, but need not include or require packet memory, protocol evaluation software and per-device switching resources. In an embodiment, Ethernet interface module EIM can include the constraint that only full-duplex operation of the corresponding device is allowed, and all ports on the corresponding device associated with an Ethernet interface module EIM operate at the same data rate.

Full duplex operation allows concurrent bidirectional communication between a pair of devices. With full duplex operation each device can concurrently transmit and receive and accordingly, each Ethernet interface module is capable to concurrently transmit and receive frames.

Ethernet interface module EIM can be configured to read every transmitted frame up through at least a frame destination address field. If the destination address of a frame does not match the Ethernet interface module EIM address or one of a multicast or broadcast address that Ethernet interface module EIM is programmed to receive, the Ethernet interface module EIM may either discard the packet frame or forward it such as described below. The ability to forward the frame upon receiving the address field and without receiving the entire frame can reduce the circuitry needed for the EIM and can reduce latency in communication of the frame to another device.

Ethernet interface module EIM may be arranged to operate either as a "field nodes" or as an "end node". The designation as a field node or end node refers to the location and role of the Ethernet interface module EIM in a network. When only one port of the two ports P1, P2 has an Ethernet link, then Ethernet interface module EIM will operate as an end node. If Ethernet interface module EIM has both ports P1, P2 connected it will operate as a field node.

When Ethernet interface module EIM operates as a field node, while a frame is received on one of the ports P1, P2, the destination address bytes are for a match with the MAC address and one-or more multicast addresses supported by device 201 and stored in Ethernet interface module EIM. If there is an address match and if the destination address is a unicast address of device 201, the destination address of the frame is replaced with a selected one of the multicast addresses stored in Ethernet interface module EIM.

When Ethernet interface module EIM is designated as an end node, if a received frame does not match the MAC address or one of the supported multicast addresses or if its Ethertype does not match, it is discarded. If all of these checks pass, the source address of the incoming frame is used as the destination address of the outgoing frame so that the frame is sent back to the source controller that generated it. The MAC address of the device 200 is used as the source address in the transmitted frame. Transmission of the frame is begun out the transmit portion of the same port it was received on reflecting the frame back to the source.

By combining frame injection apparatus 200 with an Ethernet interface module EIM a field node device having an Ethernet interface module EIM may be used to reflect frames back out a port over which the frame was received. In some embodiments, the field node may reflect a frame back to a source of the frame when a network device that does not include an EIM or a frame injector is connected to one of the ports of the device. For example, if a field node device has an EIM device or a frame injector device connected to port P1 and network device that does not have an EIM or frame injector connected to port P2, the field node device may reflect frames it receives on P1 back out P1. In certain embodiments, the field node device reflects frames according to an Ethertype field included in frames. In certain embodiments, the field node device reflects frames that match one or both of the address and Ethertype of the field node and discards frames that do not match one or both of the address and Ethertype fields. Reflecting a frame may include modifying the destination address of the frame with the source address or another pre-configured address. The destination address value can be preconfigured using registers to hold a value for the return address. In some embodiments, the desired return address is included in the frame (e.g., following the Ethertype field). In certain embodiments, the source address is modified with the address of the reflecting node device.

Figure 6:
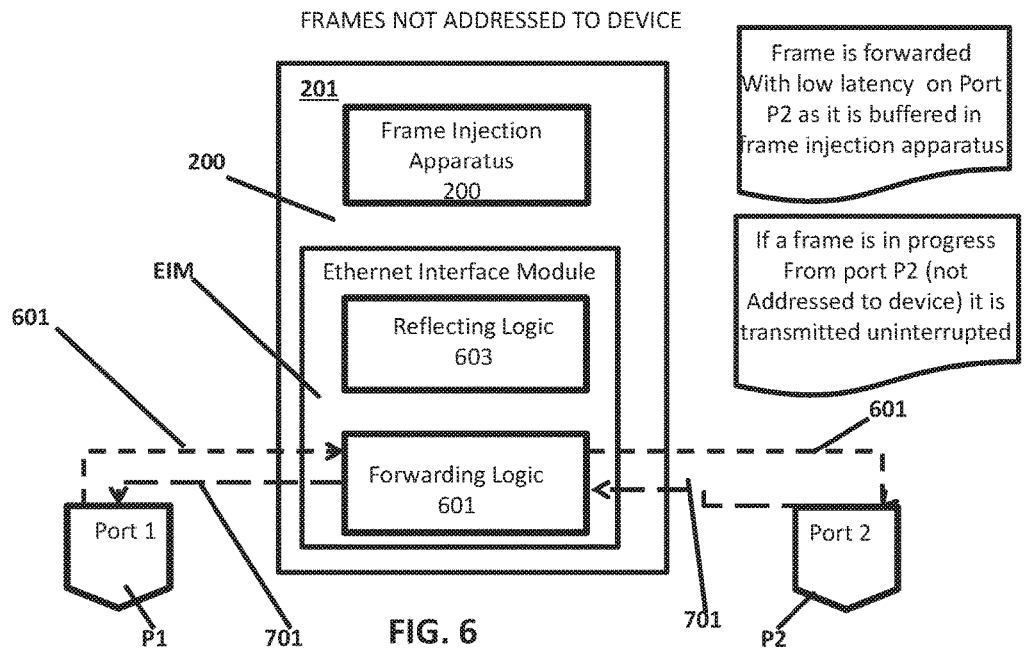
FIGS. 6, 7, 8, and 9 illustrate different states or modes of operation of a fifth embodiment of the invention.

FIG. 6 illustrates an example of configuration for operation of frame injection apparatus 200 as a reflection apparatus. Device 201 has associated therewith an Ethernet interface module EIM and frame injection apparatus 200. Ethernet interface module EIM can comprise forwarding logic 601 and reflection logic 603 and can be coupled to a first full duplex port P1 coupleable to a switched Ethernet network and a second full duplex port P2 also coupleable to the switched Ethernet network. Providing frame injection apparatus 200 allows a device that is not at the end of a line of devices (i.e., it has a valid Ethernet link on both of its ports) to reflect frames addressed to the device back out the receiving port.

In operation, network frames that are not addressed to device 201 can transition the node from receiving port to transmitting port. By way of example, frames not addressed to node device 201 received at port P1 can follow a path via forwarding logic 601 to port P2. Frames not addressed to device 201 that are received at port P2 can follow a path via reflecting logic 603 to port P1.

Figure 7:
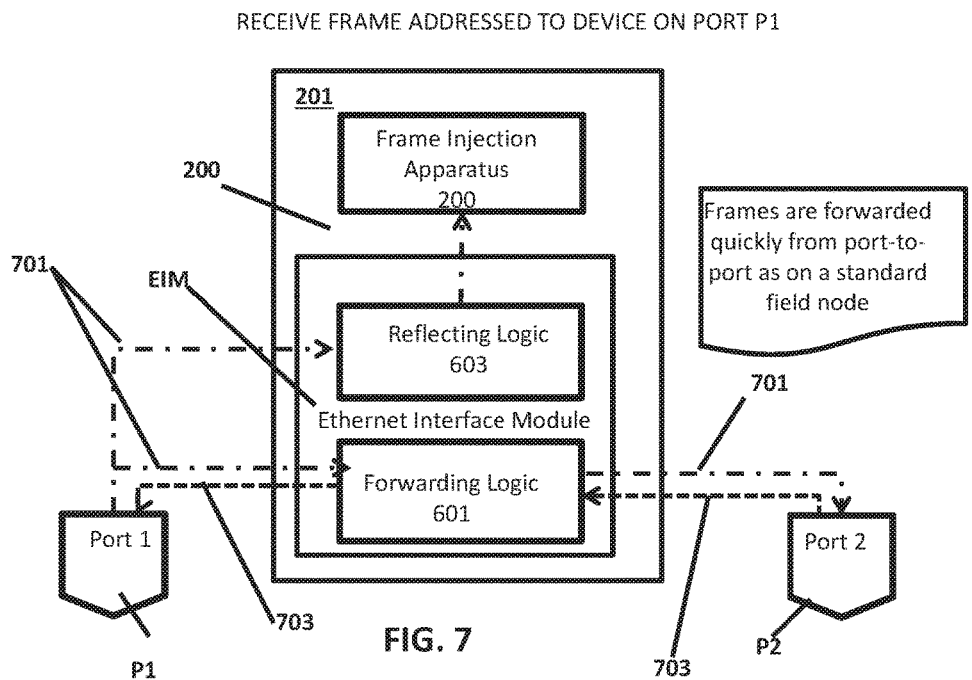

FIG. 7 illustrates an example of configuration for the operation of device 201 when a network frame addressed to device 201 is received at a receiving port P1. The network frame can be forwarded via path 701 out port P2 with processing, source address replacement, etc. Processing of the frame can be performed by logic separate from the host device and the host device need not receive a network frame for the frame to be modified. For example, if the frame is to be reflected back on the network, the reflecting logic 603 may be configured to perform the replacement of one or both of the destination address and the source address in the frame.

The network frame addressed to device 201 received at port P1 is directed by reflection logic 603 to frame injection apparatus 200 via path 701 and is buffered in the frame memory of frame injection apparatus 200 with destination address replacement, etc. as if it were being reflected by an end node.

Any network frame received at one of port P1 or port P2 that is not addressed to device 201 can be forwarded directly out the other port P2 or port P1, respectively. By way of example, a network frame received at port P2 that is not addressed to device 201 can be forwarded directly to port P1 as illustrated by path 703. The forwarding of network frames not addressed to device 201 can continue while a frame directed to device 201 is being buffered in Ethernet interface module EIM.

Figure 8:
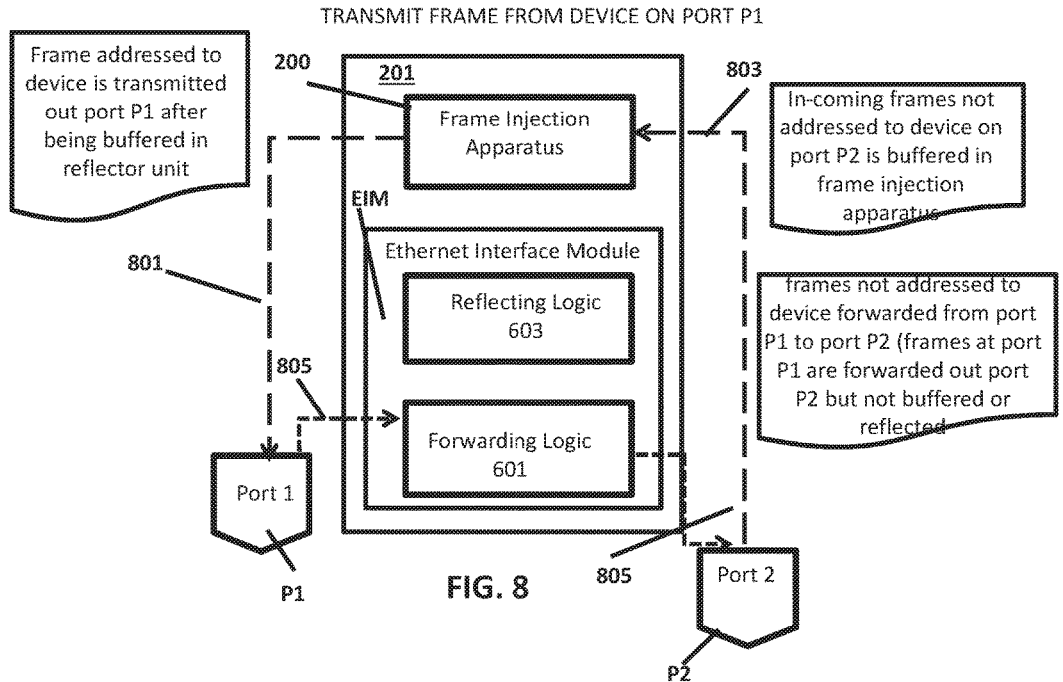

FIG. 8 shows an example of configuration for operation such that, after the network frame addressed to device 201 to be reflected has been buffered in frame injection apparatus 200, at the next opportunity when the forwarding of any received network frame not addressed to device 201 is completed (even if there is another network frame not addressed to device 201 that immediately follows), the frame buffered in the frame memory of frame injection apparatus 200 can be transmitted out of port P1 via path 801.

Any network frames that are received at port P2 while transmission from frame injection apparatus 200 is in progress can be forwarded via path 803 to the frame injection apparatus 200 and buffered in the frame memory, such as in a FIFO manner. Any network frames received at port P1 during transmission of a frame or frames from frame injection apparatus 200 can be forwarded via path 805 out port P2 as usual.

Any frames addressed to device 201 received at port P1 during the transmission from frame injection apparatus 200 can be processed by Ethernet interface module EIM and forwarded as if the node were a standard field node. No additional frames addressed to device 201 will be reflected until the previous reflection process is complete (including any stored frames that are not addressed to device 201).

Figure 9:
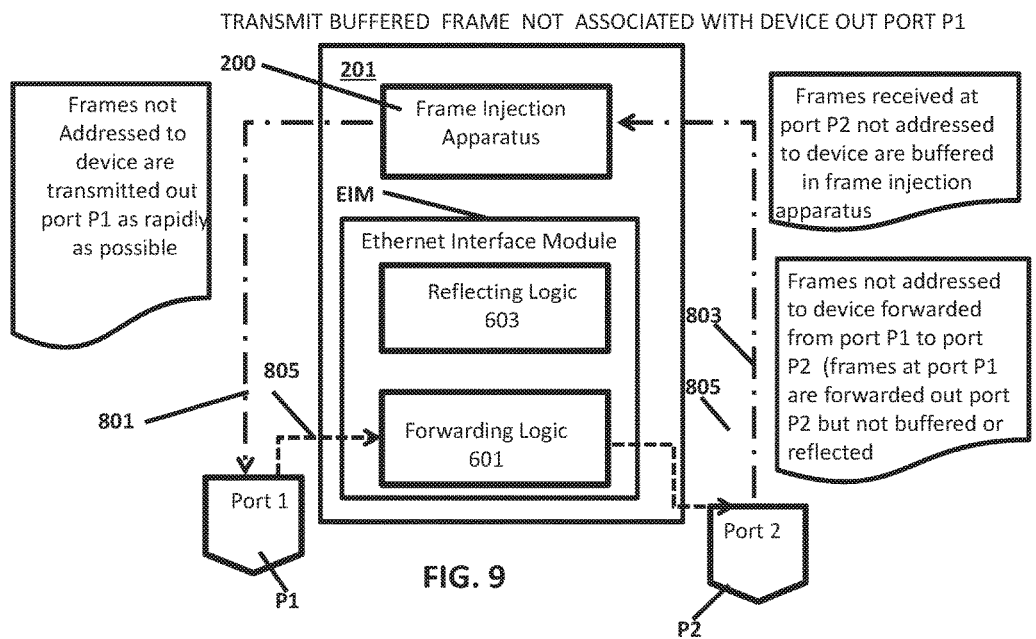

FIG. 9 shows an example of configuration for operation such that, when transmission of the reflected frame is complete, it can be immediately followed by the transmission of any buffered non-LEN frames received on port 2 during this time. Non-LEN frames can be identified using the Ethertype field of the frame. Additional frames received on port 2 can be buffered into the frame injection apparatus 200. Frames received at port P1 can be forwarded out port P2. Network frames addressed to device 201 are still not buffered for reflection because frame injection apparatus 200 is still active. This process can continue until the frame memory of frame injection apparatus 200 is empty, such that frame transmission is complete and no additional frames are received at port P2. When the frame memory of frame memory of frame injection apparatus 200 is empty, device 200 can return to the state or mode shown in FIG. 6.

The several embodiments described have generally included node devices connected to an Ethernet network using two Ethernet ports that are each duplex ports capable of transmitting and receiving. This result in dual paths throughout the implemented network. In some embodiments, the node devices may only include one receive port and one transmit port for connection to the network. This may be because the node device may include only one duplex port, or the node has only one port dedicated to receiving and only one port dedicated to transmitting. For instance, the node device may be a legacy device in which the PHY layer has separate paths for transmitting and receiving, instead of paths each capable of transmitting and receiving. In this situation, the transmit port of one device may be connected to the receive port of the next device in the network. This interconnection results in daisy chaining the devices into a unidirectional network, or loops of unidirectional subnetworks in an Ethernet network. Node devices that include one or both of a frame injector (e.g., the node device of FIG. 3) and an EIM (e.g., the device of FIG. 6) can communicate via the unidirectional network.

The invention has been described in terms of various embodiments. It will be apparent to those skilled in the art that various changes and modifications may be made without departing from the scope of the invention. It is not intended that the invention be limited in scope to the embodiments disclosed herein. It is intended that the invention be limited in scope only by the claims appended hereto.

What is claimed is:

1. A network interface module for coupling a host device to a switched network, the network interface module comprising:
   a first network port and a second network port operable to receive and transmit network frames via the switched network;
   a host port operable to transfer host frames and the network frames;
   a frame memory operable to buffer a network frame or a host frame and transfer a buffered frame to either of the first network port or the second network port, wherein the frame memory is sized to hold one host frame and multiple network frames;
   logic circuitry operable to route an incoming network frame from a receiving network port to the frame memory when a destination of the incoming network frame differs from the host device and the other network port is busy transmitting the host frame from the frame memory, and route the incoming network frame directly from the receiving network port to the other network port for transmitting on the switched network when a destination of the network frame differs from the host device and the frame memory is filling or empty.

2. The network interface module of claim 1, further comprising:
   a frame injection apparatus including an injector input and an injector output, respectively coupleable to the switched network via at least one of the first and second network ports;
   wherein the frame injection apparatus operates in an idle state in which the incoming network frame received at the injector input from the switched network is coupled to the injector output, and transitions to a transmit state when the frame memory includes a stored full host frame and the injector output is not in the process of transmitting the incoming network frame, and wherein the frame memory is coupled to the injector output to transmit the stored full host frame in the transmit state.

3. The network interface module of claim 1, further comprising:
   a frame injection apparatus including an injector input and an injector output, respectively coupleable to the switched network via at least one of the first and second network ports;
   a size memory to store a size of a frame stored in the frame memory, the size being stored when an entire frame is stored in the frame memory;
   wherein the frame injection apparatus operates in an idle state in which the incoming network frame received at the injector input from the switched network is coupled to the injector output when the size is zero; and operates in a transmit state in which the frame memory is coupled to the injector output to transmit the frame stored in the frame memory onto the switched network when the size is not zero.

4. The network interface module of claim 1, comprising:
   the logic circuitry further operable to: selectively couple Ethernet network frames from the first port to the second port and operable to couple network frames from the second port to the first port;
   selectively couple Ethernet network frames received from the first port to the frame injection apparatus and operable to couple network frames received from the second port to the frame injection apparatus; and
   reflect a network frame received at the first port back out the first port and to reflect a network frame received at the second port back out the second port.

5. The network interface module of claim 1, including:
   a first frame injection apparatus and a second frame injection apparatus, each respectively coupleable to the switched network via the first and second network ports, wherein the first frame injection apparatus is operable to inject host frames from the host device onto the switched network via the second network port, and the second frame injection apparatus is operable to inject host frames from the host device onto the switched network via the first port.

6. The network interface module of claim 1, including a transmit frame selector operatively coupled to the frame memory, wherein the transmit frame selector is operable to wait to transmit a buffered frame to the first or second network port when the logic circuitry is routing the incoming network frame and immediately initiate transmitting the buffered frame when the forwarding of the incoming network frame is completed.

7. The network interface module of claim 1, wherein the frame memory includes a first in first out (FIFO) buffer, and wherein the logic circuitry is operable to store the incoming network frame in the frame memory in a FIFO manner when the incoming network frame is received when the transmitting of the host frame is in progress.

8. The network interface module of claim 1, wherein the network frame includes a destination address and the logic circuitry is operable to direct the network frame incoming at the receiving network port to one of the host port, the frame memory, or the other network port according to the destination address when less than all of the network frame is received by the network interface module.

9. A network interface module for coupling a host device to a network, the network interface module comprising:
   a first network port and a second network port operable to receive and transmit network frames via the network;
   a host port operable to transfer host frames and the network frames;
   a frame memory operable to buffer a network frame or a host frame and transfer a buffered frame to either of the first network port or the second network port, wherein the frame memory is sized to hold one host frame and multiple network frames;
   logic circuitry operable to reflect an incoming network frame back to a receiving network port for transmitting via the network and to route a first incoming network frame to the frame memory when the first incoming network frame is to be forwarded from the receiving network port to the other network port and the other network port is busy reflecting a second incoming network frame.

10. The network interface module of claim 9, wherein the logic circuitry is operable to route the first incoming network frame to the frame memory when the first incoming network frame is to be reflected from the receiving network port to back to the receiving port for transmitting and a second incoming network frame is being forwarded from the other network port to the receiving network port.

11. The network interface module of claim 9, wherein the logic circuitry is operable to direct the network frame incoming at the receiving network port to one of the host port, the frame memory, or the other network port when less than all of the network frame is received by the network interface module.

12. The network interface module of claim 9, including a transmit frame selector operatively coupled to the frame memory, wherein the transmit frame selector is operable to immediately initiate transmitting of the first incoming network frame by the non-receiving network port when the reflecting of the second incoming network frame is completed.

13. The network interface module of claim 9, wherein the frame memory includes a first in first out (FIFO) buffer, and wherein the logic circuitry is operable to store an incoming network frame in the frame memory in a FIFO manner when the incoming network frame is received when transmission of the host frame or the network frame from the frame memory is in progress.

14. The network interface module of claim 9, wherein the logic circuitry is operable to modify a destination address of the incoming network frame with a source address of the incoming network frame and provide the incoming network frame back to the receiving network port for transmitting via the network.

15. The network interface module of claim 9, wherein the network is an Ethernet network and the network frame includes a destination address and an Ethertype field, and wherein the logic circuitry is operable to discard or forward the network frame according to the destination address and Ethertype field.

16. A method of operating a network interface device, the method comprising:
buffering host frames received from a host device and network frames received from a switched network using a frame memory, wherein the frame memory is sized to hold one host frame and multiple network frames;
transferring buffered frames from the frame memory to either of a first network port or a second network port of the network interface device;
routing an incoming network frame from a receiving network port to the frame memory when a destination of the incoming network frame differs from the host device and the other network port is busy transmitting a host frame from the frame memory; and
routing the incoming network frame directly from the receiving network port to the other network port for transmitting on the switched network without buffering when a destination of the incoming network frame differs from the host device and the frame memory is filling or empty.

17. The method of claim 16, including:
waiting to transmit a buffered frame to the first or second network port when the incoming network frame is being forwarded between network ports without buffering; and
immediately initiating transmitting of the buffered frame when the forwarding of the incoming network frame is completed.

18. The method of claim 16, including routing a first incoming network frame to the frame memory when the first incoming network frame is to be forwarded from the receiving network port to the other network port and the other network port is busy reflecting a second incoming network frame back to the receiving network port for transmitting via the network.

19. The method of claim 18, including immediately initiate transmitting of the first incoming network frame by the non-receiving network port when the reflecting of the second incoming network frame is completed.

20. The method of claim 16, including directing the network frame incoming at the receiving network port to one of the host port, the frame memory, or the other network port according to the destination address while less than all of the network frame is received by the network interface module.

* * * * *